United States Patent [19]
Noveck et al.

[11] Patent Number: 5,218,695
[45] Date of Patent: Jun. 8, 1993

[54] FILE SERVER SYSTEM HAVING HIGH-SPEED WRITE EXECUTION

[75] Inventors: David Noveck, Lexington; John Wallace, Franklin, both of Mass.

[73] Assignee: Epoch Systems, Inc., Westborough, Mass.

[21] Appl. No.: 475,368

[22] Filed: Feb. 5, 1990

[51] Int. Cl.$^5$ .......................................... G06F 15/40
[52] U.S. Cl. ................................ 395/600; 395/425; 364/222.81; 364/230; 364/245.5; 364/246.6; 364/282.1; 364/282.2; 364/283.1; 364/962; 364/962.1; 364/974
[58] Field of Search .................. 364/DIG. 1, DIG. 2; 395/600, 425

[56] References Cited

U.S. PATENT DOCUMENTS

| | | | |
|---|---|---|---|
| 3,806,888 | 4/1974 | Brickman et al. | 340/172.5 |
| 4,429,363 | 1/1984 | Duke et al. | 364/200 |
| 4,742,447 | 5/1988 | Duvall et al. | 395/375 |
| 4,742,450 | 5/1988 | Duvall et al. | 395/700 |
| 4,761,737 | 8/1988 | Duvall et al. | 395/400 |
| 4,811,216 | 3/1989 | Bishop et al. | 364/200 |
| 4,875,159 | 10/1989 | Cary et al. | 395/600 |
| 4,887,204 | 12/1989 | Johnson et al. | 395/600 |
| 4,897,781 | 1/1990 | Chang et al. | 395/600 |
| 4,918,588 | 4/1990 | Barrett et al. | 364/200 |
| 4,942,574 | 7/1990 | Zelle | 370/85.15 |
| 4,977,582 | 12/1990 | Nichols et al. | 375/118 |
| 4,993,030 | 2/1991 | Krakauer et al. | 371/40.1 |
| 5,001,628 | 3/1991 | Johnson et al. | 364/200 |
| 5,036,518 | 7/1991 | Tseung | 371/32 |

FOREIGN PATENT DOCUMENTS 971285 7/1975 Canada.
0205965 12/1986 European Pat. Off..

OTHER PUBLICATIONS

Arnold et al., "Automatic UNIX Backup in a Mass Storage Environment", Proceed. of USENIX Assoc., Feb. 1988, pp. 131-136.
Christman, "Experience With File Migration", Los Alamos National Lab Report No. LA-9014, Oct. 1981.
Collins et al., "A Network File Storage System", Fifth IEEE Symposium, Oct. 1982, pp. 99-102.
Fiedler, "QBAX: An Incremental Backup Utility", Microsystems USA, vol. 4, No. 10, Oct. 1983, p. 84.
McGee, "Epoch Combines Magnetic Optical Drives", Computer Systems News, Oct. 31, 1988.
Epoch Systems press release, "Epoch Systems To Develop New Generations of High Capacity File Servers For Networked Workstations", Mar. 14, 1988.
Muuss et al., "BUMP the BRL/USNA Migration Project", Mar. 5, 1989, pp. 1-19.
DiDio, Oct. 9, 1989, Network World, "Server Offers Optical and Magnetic Disks".
Arneson, (1988), IEEE, pp. 45-50, "Mass Storage Archiving in Network Environments".
Hume, (1988), Summer USENIX Conference, Jun. 20-24, "The File Motel—An Incremental Backup System for Unix", pp. 61-72.
Thompson et al., 1988, IEEE, pp. 88-92, "The Operation and Use of a 2 Terabyte Optical Archival Store".
Beeler, Jul. 6, 1987, Computer World, "GTE Tries Incremental Backup", Christman, Oct. 1981.
McLarty et al., 1984, IEEE, "A Functional View of the Los Almos Central File System", pp. 10-16.
Gwatking, (1978), Department of Defense Technical Report, "An Efficient Application of Disk Storage to the DRCS Data Migration Scheme".
Miller, (1978), U.S. Department of Commerce, "Direct Access Data Migration System".
Johnson, (1975), National Computer Conference, "IBM-3850–Mass Storage System", pp. 509-514.
Johnson, (1975), Proceedings of the IEEE, "The IBM 3850: A Mass Storage System with Disk Characteristics", pp. 1166-1170.
Murray, (1972), Thesis "Document Retrieval Based on Clustered Filed", Cornell University.
Lieberman, Nov. 15, 1988, Computer Design, "Heirarchical File Server Puts Archives On-Line", pp. 36-37.

*Primary Examiner*—David L. Clark
*Assistant Examiner*—Maria N. Von Buhr
*Attorney, Agent, or Firm*—Lahive & Cockfield

[57] ABSTRACT

A file server system selectively stores and provides access to files across a local network. The system utilizes adaptive request batching, disk pre-allocation, and shadow inode logic to enable data writing operations to be executed at high speed, while conforming to stateless protocol requirements.

15 Claims, 3 Drawing Sheets

FILE SERVER SYSTEM HAVING HIGH-SPEED WRITE EXECUTION

BACKGROUND OF THE INVENTION

This invention relates generally to digital data processing, and, more particularly, relates to systems for efficient writing of data in local area networks (LANs) utilizing file servers.

The use of storage-intensive computer applications such as high-performance, high-resolution graphics has grown significantly in recent years, with indications that it will continue to grow through the next decade. Fueling user demand has been the introduction of lower cost 32-bit workstations and an increase in the base of applications software available for those systems. Because of their computational and graphics power, these workstations are employed in data-intensive applications such as electronic publishing, computer-aided design (CAD) and scientific research.

Paralleling these developments has been the emergence of industry standard communication protocols which permit users to operate in a multi-vendor environment. Each protocol defines the format of messages exchanged between devices in a network, such that the devices cooperatively execute selected operations and perform given tasks. In particular, file access protocols permit at least two machines to cooperate with a file server. The file server stores files and selectively enables remote client devices to read and write these files.

One such protocol is the Network File System (NFS) protocol, developed by Sun Microsystems, which allows users to share files across a network configuration such as Ethernet. It is most frequently used on UNIX systems, but implementations of NFS are utilized on a wide range of other systems. The NFS protocol can be described as a request-response protocol More particularly, it is structured as a set of interactions, each of which consists of a request sent by the client to the server, and a response sent by the server back to the client. Generally, the response indicates any errors resulting from processing the request, provides data sought by the request, or indicates that the request has been completed successfully. Requests are reissued by the client until a response is received. A response which indicates that a request has been performed is referred to as an acknowledgement.

Moreover, since the NFS protocol is a stateless protocol: the client is not required to retain information about requests to which the server has responded. Any failure of the server, including a crash, can be handled by the client by continuing to reissue unanswered requests until the server is again operational. Consequently stateless protocols require that the server reliably effect state changes called for by a given request, before responding to the request.

Under a stateless protocol, this function must be executed in a manner which preserves the state changes, even in the event of subsequent server failure. By acknowledging the request, the server implicitly "guarantees" that the write operation has been executed and that a subsequent server failure will not destroy the effects of the write. This assurance simplifies the client machine's task in handling a server failure. The client need merely reissue unacknowledged requests periodically until receiving an acknowledgement. The client device need not consider server failure and re-initialization. This feature of stateless protocols, such as NFS, greatly simplifies their implementation and use.

Certain networks that utilize UNIX and NFS employ the Fast File System, a relatively high-speed file system for UNIX that includes support for operations used in performing NFS requests. This support implements certain operations, such as file creation, in conformity with the statelessness requirements of NFS. For write operations, the Fast File System provides synchronous write operation which conforms to NFS statelessness requirements.

Unfortunately, the NFS requirement for providing assurances in write operations is extremely burdensome for the server, resulting in low write throughput. In particular, the assurances required by stateless protocols are typically enabled by the time-consuming process of writing the changed states to stable storage—i.e., memory considered reliable enough to serve as a repository for the persistent state of a given application. Generally, disk media are considered stable, as are battery-backed RAM devices. The latter are semiconductor memory devices having sufficient battery-based reserve power to preserve the validity of stored data, notwithstanding external power interruptions. Battery-backed RAM devices can provide stable storage operating at higher speeds than disk, but at the expense of increased system complexity and cost.

Conventional NFS server configurations, including those utilizing the Fast File System, have been unable to provide high rates of throughput in handling write operations. Write operation speeds typical of conventional practice are on the order of 50-100 kilobytes/second. This speed limitation markedly increases write response time throughout the network.

In conventional systems, higher speeds are attainable only by employing additional hardware, such as battery-backed RAM. This additional hardware significantly increases the cost and complexity of the system.

Accordingly, there exists a need for file server systems that can operate in accordance with stateless protocols, while providing higher write speeds and avoiding the requirement for additional hardware, such as battery-backed RAM.

Examination of an NFS write request will illustrate the temporal issues involved in a write operation. A block of data is transmitted from the client to the server, together with certain control information. This control information includes three parameters: (i) the "file handle," which identifies the file into which the write information is to be executed; (ii) the length of the data; and (iii) the target displacement of the data within the file.

Before acknowledging the request in a stateless protocol, the server must commit to stable storage all file changes that constitute the write operation, or sufficient data to reliably reconstruct the changes. The stable storage is typically a disk. As noted above, by acknowledging the request, the server implicitly guarantees that the write operation has been executed and that a subsequent server failure will not negate the effects of the write. Thus, all file states changed by a write request, including the data sent in the request itself, must be written to stable storage, and all disk data blocks modified by the request must be written synchronously to disk.

In recovering from a system crash, the server must be able to locate the modified data blocks on disk, using only the file handle and data structures on disk, but not data in memory. Therefore, if the data is being written to an area for which disk space has not been allocated, or for which the on-disk pointer to the disk data block has not yet been written, then all blocks containing pointers to the new data blocks must be synchronously written as well. Additionally, if the write operation extends the file, as many write operations do, the disk block containing file size information must also be written to disk synchronously.

In a UNIX system, the term "file size" refers to the ending displacement, in bytes, of the last data present in a file. In accordance with UNIX practice, no read operation is permitted to cross this boundary. Writing to an area beyond the current file size increments the file size to the ending displacement of the write operation. If a write leaves a gap between the old file size, the gap area must appear as zero bytes. In UNIX systems, this is implemented in part by leaving zero mapping pointers and having them represent blocks completely filled with zeroes. An area consisting of such blocks is referred to as a "hole."

These rules of file server behavior have significant effects on write operations in the Fast File System. Consider, for example, a new file being written sequentially. Assume that each write operation provides 8K bytes of data to write to one disk block of the new file, with each block newly allocated in the request which writes it. Because the file is being extended by each request, the file size must be updated for each operation. This requires a synchronous write of the file inode—i.e., the main disk structure which represents a file in UNIX. The inode contains values indicating the size of the file, access and modify times, locations of portions of the block in which the file's data is located and, if necessary, locations of indirect blocks from which the locations of the remaining data blocks may be determined.

The Fast File System attempts to enhance access speed by establishing cylinder groups, each group being a contiguous region of disk cylinders treated as a unit for purposes of file allocation. To increase locality of file access, the set of inodes on each disk is divided among the cylinder groups, with files assigned to individual cylinder groups based on the directory to which each corresponds. Large files are allocated to multiple cylinder groups, with allocation periodically switched to a new cylinder group as the size of the file passes certain defined limits.

In the Fast File System, for files smaller than 96K bytes, each NFS write operation which extends the file requires two disk writes, one for the data block and one for the inode containing the size and the data pointer. Generally, the data block and the inode will be on different disk cylinders (the collection of disk blocks accessible without moving the arm supporting the disk read-write heads). Each request will therefore require two movements of the disk arm from one cylinder to another—referred to as SEEKs—as well as two writes. SEEKs slow I/O operations dramatically, and become even more time-consuming as the length of the SEEK path increases.

For files larger than 96K bytes, the Fast File System is configured so that data pointers are contained in indirect blocks. These indirect blocks must be written on each request which writes a previously unwritten data block, in addition to the inode with the updated size, if the file is being extended. Therefore, each such NFS write request for files larger than 96K bytes will generally require three disk writes. Moreover, as the file becomes larger, the distances among the three blocks to be written will tend to be larger. This causes the required SEEKs to become slower.

Thus, each NFS write operation for large files will typically require three disk writes, each requiring a long SEEK. Moreover, each write must be synchronous, necessitating operating system scheduling delays before each successive I/O operations is executed. The result is very poor performance.

Accordingly, it is an object of the invention to provide improved file server systems having enhanced operational speed.

It is a further object of the invention to provide such file server systems characterized by high reliability and low cost. Other general and specific objects of the invention will in part be obvious and will in part appear hereinafter.

SUMMARY OF THE INVENTION

The foregoing objects are attained by the invention, which provides a digital processing system including at least one file server for storing and providing selective access to digital data files and a set of client devices. The set of client devices includes at least one digital processor, and the client devices are coupled to each other and coupled to the file server by a set of controllable interconnections, that form a local network. In accordance with a selected protocol, the local network can be accessed to enable the client devices to obtain access, across the local network, to data files stored in the file server.

The protocol includes a set of formats for requests to execute write operations, and is structured as a set of interactions. Each interaction consists of a request sent by a client device to the file server and a response sent by the file server back to the client device. The response can provide data sought by the request, an acknowledgement indicating that the request has been completed successfully, or an error message indicating errors resulting from processing the request.

Moreover, the file server includes stable storage space for stably storing file system state information accessible to client systems and application programs on those systems. This information includes the contents of files and associated control information which must be reliably stored to provide required file system semantics. In accordance with the protocol, the file server writes state changes necessitated by a request to stable storage before responding to the request, so that the changes are preserved, notwithstanding failure of the server.

In one aspect of the invention, the file server detects multiple simultaneously pending write requests corresponding to the same file, and combines the multiple simultaneously pending write requests, to eliminate certain state-change-write operations. As a result, file server write throughput is increased.

The combining operation can include combining, for the multiple simultaneously pending write requests, multiple write operations of indirect blocks and inodes. In one aspect of the invention, the combined write requests can be executed in a batch operation. In another aspect of the invention, the file server executes a first pending write request, and then tests for a second pending write request upon completion of the first pending write request.

In another aspect of the invention, the file server detects substantially sequential write operations that extend a given data file, and in response to detection of such sequential write operations, pre-allocates blocks of storage space for file locations to be written.

The detection logic includes elements for recognizing a pattern of sequential write requests extending a file. The pre-allocation includes allocating a selected number of disk storage blocks for file locations which are to be written, and selectively scheduling writing of indirect blocks that contain pointers to the selected number of allocated blocks.

The invention can also include elements for detecting indications that a previously substantially sequential access pattern is no longer sequential, and for responding to such non-sequential access by inhibiting further pre-allocation.

In a further aspect of the invention, the file server maintains a bit mask of written blocks, consisting of a set of bits, each bit being representative of a logical block which may or may not have been written during a given period of time. The logical blocks represented by the bit mask consist of a contiguous set containing at least an end-of-file block whose presence was last securely indicated in stable storage, and continuing for a sufficient number of subsequent blocks to render unlikely the possibility that a sequentially writing client device would write to a block not represented in the mask. In accord with the invention, the file server clears the bit mask of written blocks before executing the combined requests. The server executes the combined requests and then reads the bit mask of written blocks, now including all blocks beyond the original end-of-file written by any of the combined operations, including the new end-of-file block. In response, the server updates file size information, and automatically de-allocates unwritten, previously pre-allocated blocks in a storage region between the first end-of-file and the new end-of-file.

The file server can include selected disk areas reserved for storing updatable file state information including inodes, the selected disk areas including designated inode areas for storing the inodes. In accord with this aspect of the invention, the server writes file state information to a selected storage location proximate to a storage site in which file data is being written. The server then marks the file state information, so that it can be subsequently located in the substitute location and moved to update existing file state information. The marking operation includes designating the shadow inode so that it can be rapidly located, and so that changes within the shadow inode can be indicated in a designated home inode of a given file in the event of file server failure. The server can also detect when a file is being extended into a new region of disk storage, designate a new inode area in the new region of disk storage, designate the new inode area as a shadow inode, and update the shadow inode to reflect changes caused by subsequent write operations. These operations significantly reduce SEEK operation time necessary to write file state information.

The invention will next be described in connection with certain illustrated embodiments; however, it should be clear to those skilled in the art that various modifications, additions and subtractions can be made without departing from the spirit or scope of the claims.

BRIEF DESCRIPTION OF THE DRAWINGS

For a fuller understanding of the nature and objects of the invention, reference should be made to the following detailed description and the accompanying in which.

DESCRIPTION OF THE ILLUSTRATED EMBODIMENTS

To facilitate description of the illustrated embodiments, certain terms, utilized herein to describe features of the invention, are defined as follows:

File System: 1) A set of operations including reading, writing, opening, creating and removing files. 2) A self-contained subset of disk storage containing the disk structures used to represent a collection of files and directories.

In-core Inode Structure: An area of memory containing an image of an inode as it appears on disk, together with other information useful in processing an inode. The collection of in-core inode structures is referred to as the inode cache and is intended to contain frequently referenced inodes, to avoid frequent recourse to disk or the buffer cache to obtain inodes.

Block Map: A collection of mapping pointers, each of which designates the disk location of one logical block of the file. In UNIX file systems, mapping pointers are contained in the inode and one or more indirect blocks.

Logical Block: The smallest unit of mapping in a file system. All parts of file within a given logical block are, if present, contained in a contiguous set of disk sectors. A logical block size of 8K is assumed for the purpose of the discussion below.

Fragment: In the Fast File System, the smallest unit of disk allocation. For files below a size threshold, the last logical block of the file does not have a full disk block allocated to it. Instead, an integral number of fragments big enough to hold all of the data actually written in the last block of the file is allocated. The fragment size must be a multiple of the disk sector size and a sub-multiple of the logical block size.

Disk Sector: The smallest physically addressable piece of disk. A common sector size and the one assumed in the discussion below is 512 bytes.

FSCK: A file system checking program which scans a file system after a system failure. FSCK resolves inconsistencies caused by the fact that only a subset of changes to the file system may have been written to the disk with others lost in the buffer cache when the system failed. In the Fast File System, care is taken in the file system to make sure that no inconsistencies which cannot be resolved automatically by FSCK are allowed to appear.

Daemon: A task devoted to servicing external requests of various sorts. Relevant in the discussions below are NFS Daemons responsible for receiving, acting upon, and responding to NFS requests, and Block I/O Daemons responsible for asynchronously issuing NFS requests over the network for a client task.

Figure 1:
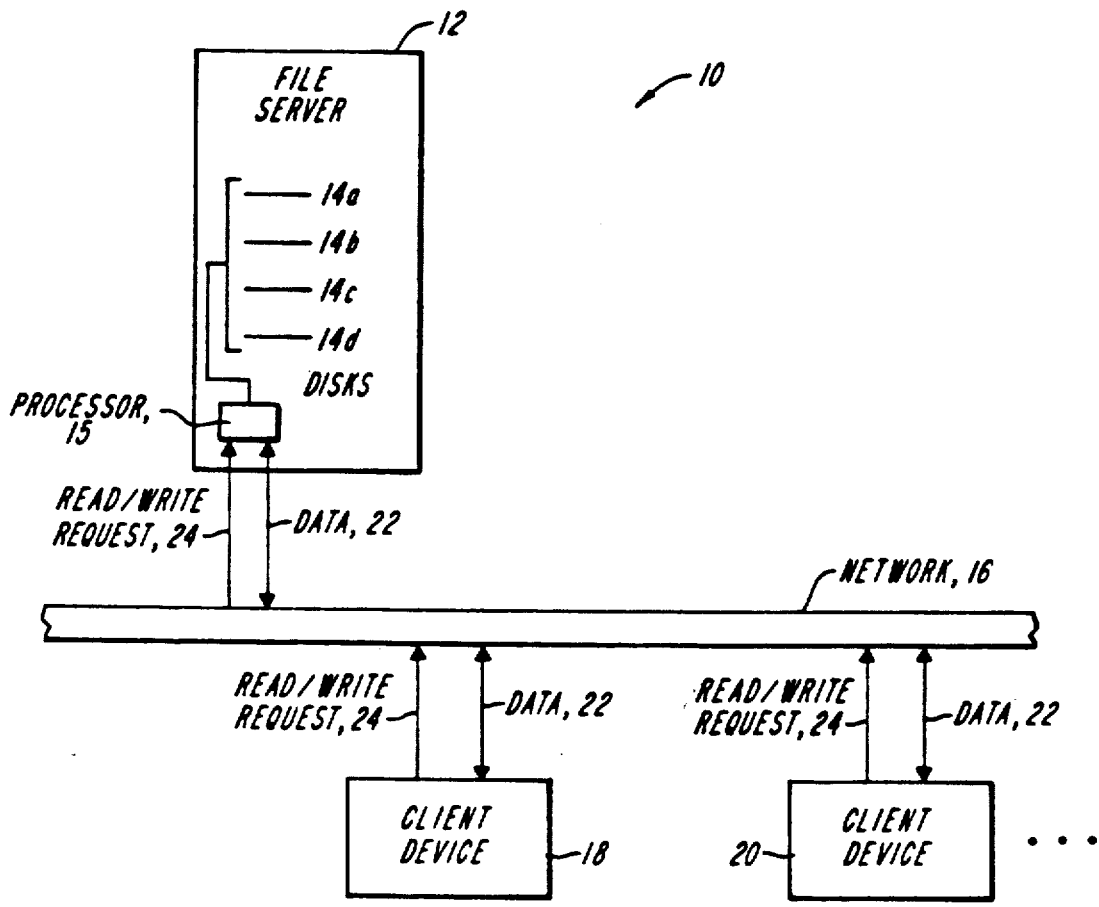
FIG. 1 is a schematic block diagram depicting a network incorporating a file server system constructed in accordance with the invention.

FIG. 1 is a schematic block diagram depicting a LAN 10 incorporating a file server 12 constructed in accordance with the invention. The LAN includes a file server 12, a conventional NFS "stateless" protocol network 16, and a set of client devices 18 and 20. The file server includes a plurality of storage media, which can be, for example, magnetic or optical disks 14a-14d. The invention can be practiced in connection with the file server structures described in co-pending U.S. patent application Ser. No. 454,066, the teachings of which are incorporated herein by reference. The disks 14a-14d incorporated in the file server store data files and control information representative of, and controlling the processing of, selected parameters of the data files.

The file server can also contain a buffer cache—i.e., an area of memory used by conventional UNIX systems to store images of areas on disk, in order to improve system performance. Performance is improved by referring to the buffer cache instead of executing disk read operations, and by avoiding many disk writes for blocks modified many times over a short interval. Because writes for modified blocks are not executed immediately, a block in the cache may differ from the corresponding area on disk. Such a block is referred to as a "dirty" block. It is the responsibility of external systems using the buffer cache, such as the file system code, to force write operations to the disk when appropriate to maintain the integrity of the data on the disk, and to conform to the constraints of file system operations, including the synchronous operations used to satisfy NFS requests 24.

The client devices can assert read/write requests in a known manner via the NFS network 16 to the file server 12. The file server responds to read requests 24 in accordance with conventional practice, to provide the client devices 18 and 20 with access to digital data files stored on the disk media 14a-14d incorporated in the file server 12. Digital data is transferred via digital data lines 22. During write operations, the file server 12 responds in a manner set forth below, to enable the client devices to write selected data onto the disks.

In the illustrated embodiments discussed herein, data write processes in accordance with the invention are executed by the file server's central processing unit (CPU) 15 in connection with software provided in the Appendices filed herewith.

The invention exploits the understanding that in order to provide enhanced NFS write performance, it is necessary to reduce the ratio of disk operations to NFS write requests as close as possible to unity. Performance is also enhanced by eliminating SEEKs from these disk operations, compressing those that remain, and by restructuring processes so that successive disk I/O operations can be pipelined—i.e., so that the processing for one can begin before the processing for the last has completed. If disk I/O requests cannot be pipelined, as is the case with the current synchronous implementation, then the inherent operating system scheduling delays will slow down the process of performing the NFS write requests both directly and by causing lost disk revolutions. Delays due to lost revolutions occur when a subsequent disk I/O request cannot be issued in time to obtain data currently passing under the disk heads. The invention employs three methods to allow NFS writes to be performed more efficiently as outlined above: batching, pre-allocation and shadow inodes.

Figure 2:
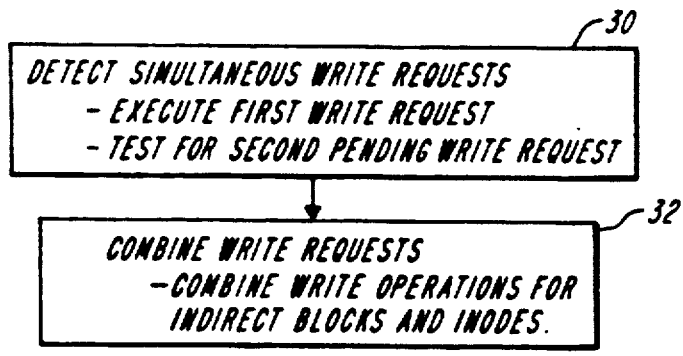
FIG. 2 is a flow diagram depicting a batching operation executed by the file server system of FIG. 1.

FIG. 2 illustrates a batching operation. The batching logic takes advantage of the fact that most often a single client will issue multiple write requests to the same file and that therefore, multiple writes of indirect blocks and inodes for multiple requests may be combined and only executed once. Pre-allocation recognizes a pattern of sequential or approximately sequential client writes extending a file and allocates disk for file locations which will soon be written. By pre-allocating a large number of blocks, writes of indirect blocks may be further reduced below the level provided by using batching alone. Shadow inode logic further improves efficiency by temporarily moving the most recent copy of inode information away from its normal location to an area of disk closer to data currently being written so that SEEKs necessary to write the inode and move the disk arm back to the data area again are significantly shorter.

Batching allows the processing of multiple requests to the same file all pending at the same time to be processed together in a more efficient manner than each could be processed individually. To comply with the stateless NFS protocol, none of the requests that form part of a batch is acknowledged before all of the disk writes that are required for any request within the batch have been executed. As can be seen from FIG. 2, batching involves detecting simultaneous write operations 30 and subsequently combining them 32. As FIG. 2 indicates a first write request can be executed followed by testing for a subsequent pending write request. The efficiency benefit is that far fewer disk writes need be executed. Let us assume that a given client is capable of keeping five write requests pending. The batching logic will, as described below, recognize this situation and process the five requests as a single batch. In the case of a large file being created using sequential writes, without batching, fifteen synchronous disk writes would be required to process these requests. With batching, seven disk writes would in almost all cases be required, reducing the number of disk I/O's per NFS write from 3 to 1.4. Further, the number of I/O's requiring SEEKs would be reduced from fifteen to three. By eliminating many synchronous writes, batching also improves performance by eliminating lost disk revolutions due to synchronous writes. In this example, four of the seven disk writes and all of those not involving a SEEK could be issued in advance of completion of their immediate predecessor, allowing immediate scheduling without a lost revolution.

Figure 3:
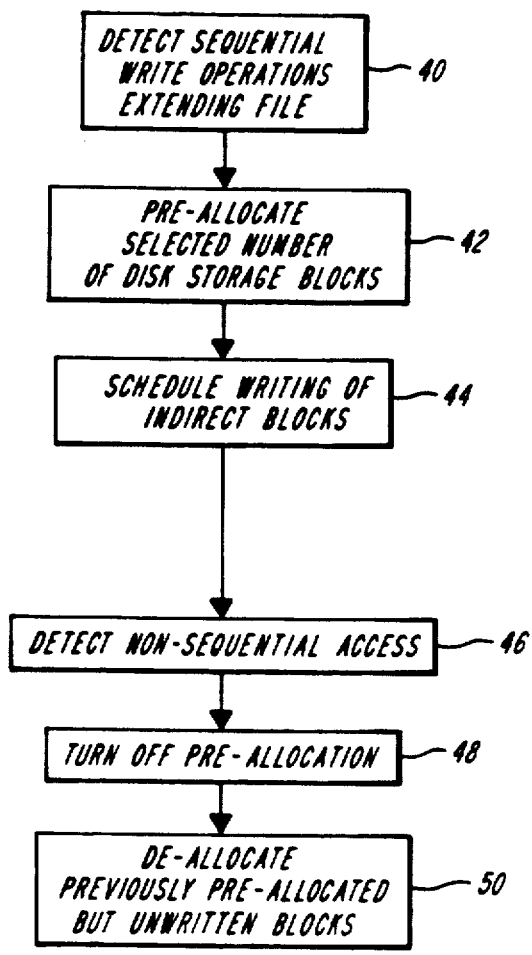
FIG. 3 is a flow diagram depicting a pre-allocation operation executed by the file server system of FIG. 1.

FIG. 3 is illustrative of a pre-allocation sequence of the invention. Pre-allocation logic recognizes sequential write requests extending a file 40, allocates disk 42, and schedules the writing of indirect blocks containing modified disk pointers in advance of need 44. This allows fewer writes of indirect blocks to be executed and allows this I/O to be executed in parallel with other operations. The pre-allocation logic must recognize and deal with situations in which requests arrive in an order only approximately sequential 46 due to scheduling idiosyncrasies within the client operating system. Requests may arrive out of order with some blocks skipped. These skipped blocks may arrive later in the same batch or they may still be missing when the batch ends. In each case, the pre-allocation logic will, as described below, recognize the situation and perform the write as required by the NFS protocol. Upon termination of a sequential write operation, the pre-allocation logic is disabled 48 and previously pre-allocated but unwritten blocks are de-allocated 50. In the example above, pre-allocation might allocate fifty blocks at once and commit the associated pointers to disk in a single write. In this case ten batches would involve only a single write of an indirect block executed asynchronously. The average number of disk I/O operations per NFS write request would drop from 1.4 to 1.22. The number of SEEKs per batch would drop from 3 to 2.1.

Figure 4:
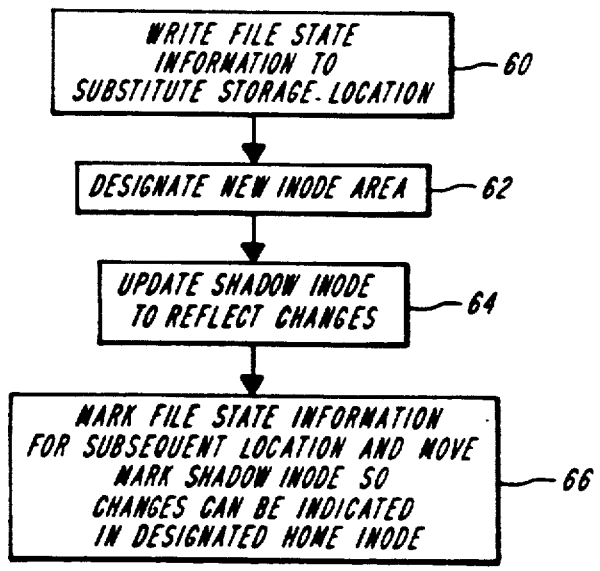
FIG. 4 is a flow diagram depicting the use of shadow inodes in the file server system of FIG. 1.

FIG. 4 depicts shadow inode usage. Shadow inode logic also recognizes sequential write requests extending the file and uses this knowledge to move the inode information to the area of the disk where data writes are currently going on. In the Fast File System the disk is divided into cylinder groups. When a file is being extended and moves into a new cylinder group, an inode area from that cylinder groups is obtained and used as a shadow inode 60 and 62. The shadow inode is then updated to reflect changes brought about by subsequent writes 64. This makes most of the remaining SEEKs much shorter, as they are now within the same cylinder group rather than spanning a large piece of the disk radius. Shadow inodes are marked 66 so that they may be found and the changes within them reflected in the file's home inode in the event of a system failure. In the example above, in the worst case, when indirect block and file data are in different cylinder groups, rather than having 2.1 inter-cylinder-group SEEKs per batch, the server would instead have an average of 1.9 short SEEKs contained within a cylinder group and a maximum of 0.2 long, inter-cylinder-group SEEKs per batch.

The following describes the manner in which requests are issued by client devices in accordance with the invention Assume that a task on a client is writing a file sequentially. As each write is executed, data is moved into the buffer cache. As each logical block is filled, an asynchronous write of that block of the buffer cache is executed. This write is executed by passing the write request to a block I/O daemon if available. If the daemon is unavailable, the write request is executed synchronously by the client task itself.

As a result of this, the client may issue and have pending at one time a number of write requests equal to that client's number of block I/O daemons, plus one. This is the basis for effective batching. Depending upon the size of the user's writes and the client operating system's scheduling policies and network code, the server may receive write requests out of order. The server must therefore be able to detect and properly respond to the client task's underlying sequential request pattern, despite any distortion introduced by the network apparatus between the client and the server.

In order to provide batching and the other performance enhancements, it is necessary to maintain inter-request state information so that the handling of multiple requests to the same file may be properly coordinated. Traditionally, all of the inter-request context for a file has been maintained within the in-core inode structure. While this is a possible implementation, in a preferred practice of the invention, in view of the size of the necessary information, the information is maintained in a set of special data structures devoted to maintaining inter-request state for files for which the maintenance of such information is worthwhile. These data structures are referred to as I/OSTRINGs, and a pool of them is maintained for assignment to individual inodes based on the pattern of I/O operations. The in-core inode structure contains a pointer to a list of I/OSTRINGs associated with the inode.

I/OSTRINGs may be used to maintain information needed to optimize a string of read requests by means of read-ahead, a string of write requests as described below, or for any other use in which such inter-request context would be helpful. The I/OSTRING is organized into a general area containing generic information used to provide the I/OSTRING facility and an application-specific area used in a different fashion for each possible type of I/OSTRING. The following information is contained in the general area:

1. Forward and backward links connecting all I/OSTRINGs in a list ordered by the time of last use.
2. A pointer to the associated inode.
3. An indication of the type of the I/OSTRING. When a request is made to de-allocate an I/OSTRING, a specific routine is called based on the I/OSTRING type. This routine has the option of vetoing the de-allocation and is responsible for making any data structure changes made necessary made the de-allocation of the I/OSTRING.
4. A pointer to the next I/OSTRING associated with the same inode. Multiple I/OSTRINGs all of different types may be associated with a given inode.
5. Expiration time for this I/OSTRING. The I/OSTRING list is periodically scanned and an attempt is made to de-allocate those that have expired.
6. The timeout interval for this I/OSTRING. Whenever an I/OSTRING is used, this increment is added to the current time to form the I/OSTRING's new expiration time.
7. A HOLD COUNT for the I/OSTRING. Whenever the HOLD COUNT is non-zero the I/OSTRING will not be de-allocated. Ongoing operations increment the HOLD COUNT to prevent the de-allocation of an I/OSTRING when successful execution depends on its continued existence. If an attempt is made to de-allocate an I/OSTRING while the HOLD COUNT is non-zero, the I/OSTRING will only be de-allocated when the HOLD COUNT reaches zero.

Figure 5:
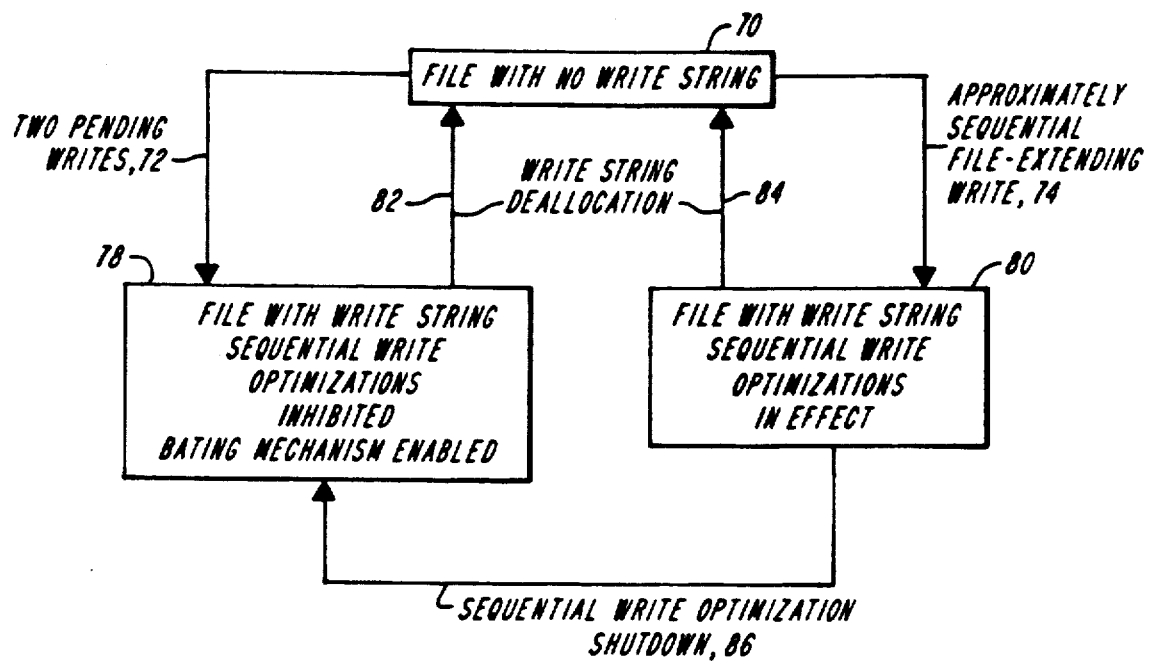
FIG. 5 is a flow diagram depicting I/OSTRING allocation in the file server system of FIG. 1.

FIG. 5 is illustrative of I/OSTRING allocation. Within the file system write process, the server allocates an I/OSTRING to a file 70 when either or both of two conditions obtain: two or more write requests active to the same file 72 or an approximately sequential pattern of writes extending a file 74. In either case, the I/OSTRING will be put into the form of a WRITE STRING and initialized to serve as the inter-request context for multiple write requests. When a WRITE STRING is present for a file, all write requests are handled using the batching mechanism 78. If only one request should be pending, it will be handled as a degenerate batch. Use of pre-allocation and shadow inodes, the two sequential write optimizations 80, depends on the maintenance of an approximately sequential pattern of file-extending writes. Such a pattern is assumed to reflect an underlying pattern of sequential writes by the client task which will typically be continued until the client finishes writing the file, at which point the write string is de-allocated 82 and 84. Whenever the pattern of I/O calls this assumption into question and the utility of sequential write optimization no longer assured, all future activities associated with the sequential write optimizations are shut off 86 and only batching is used subsequently.

In order to successfully batch requests, the system must of course be capable of handling more than one request for a given file at a time. The typical UNIX handling of file locking prevents this and so had to be changed. In place of a single lock for each inode, the invention utilizes three levels of locking to enable proper coordination of multiple activities on the same file. The three levels of locking are referred to herein as Exclusive, Unique, and Shared.

Possession of an exclusive lock grants to the holder complete control of the file data structures. No other task will be granted any sort of lock for the inode in question, whether exclusive, unique, or shared while an exclusive lock is in effect. Nor will an exclusive lock be granted while any other locks are in effect. A task requesting an exclusive lock will wait until no other locks are in effect before proceeding.

Possession of a unique lock grants to the holder the right to modify file data structures but only in such a way as not to make visible to other requests an inconsistent state. By holding a unique lock, a request prevents multiple uncoordinated updates of such file control data as the file size and the block map. No other task will be granted an exclusive or unique lock while a unique lock is being held. Similarly, a unique lock will not be granted if any other task possesses an exclusive or unique lock. A task requesting a unique lock will wait until only shared locks are in effect before proceeding.

Possession of a shared lock grants to the holder the assurance of a consistent set of file control data. Possession prevents any exclusive lock from being granted but is consistent with simultaneous possession of a unique lock and any number of other shared locks by other tasks. A task requesting a shared lock will, however, wait until no exclusive locks are in effect before proceeding.

For the implementation of write operations, the following information about lock handling is relevant. Read requests are processed using only a shared lock to assure that the data seen is consistent. Write operations are performed holding an exclusive lock only in those cases in which the write spans multiple data blocks. This is to assure that writes operations are atomic. Other writes hold a unique lock during the setup for an operation and then may retreat to holding only a shared lock while writing the file data, re-obtaining an exclusive lock if necessary when updating file control data. This arrangement is critical to effective write performance.

Each write operation consists of a set of phases. For write operations contained within a single logical block of the file, each phase is passed through only once. The phases are as follows:

1. During the preparatory phase, arguments are checked, an appropriate lock obtained and the file marked as written. The lock obtained is an exclusive lock in the case of multi-BLOCK WRITE and a unique lock otherwise.

2. During the BLOCK START phase, preparations are made to write a single block. Disk space is allocated if necessary and the physical location of the block to be written determined. A WRITE STRING is obtained if necessary and the request may join in a batch. All actions in the BLOCK START phase are directed by the routine WSOP_START.

3. During the BLOCK WRITE phase, the data is written, either to the buffer cache or, in the case of an NFS-requested operation, synchronously to disk.

4. During the BLOCK FINISH phase, the file size is updated if necessary and any required disk writes of indirect blocks and inodes executed. In the case of writes requested by NFS, these must be executed before the request is responded to. All actions in the BLOCK FINISH phase are directed by the routine WSOP_FINISH. If multiple ks are being written, after on of the BLOCK FINISH phase, the BLOCK START phase will be entered for the next block to be written.

5. During the completion phase, any remaining locks for the file's inode are released.

State information regarding the processing of a single write request is maintained in a data structure called a WSOP. The WSOP is initialized by WSOP_START and is then passed to all the routines involved in processing a write request, including WSOP_START, WSOP_FINISH, and the block mapping routine BMAP_GET1_WRITE. Each routine uses information stored in the WSOP by previous routines and updates it to reflect the state changes made by the current routine. The following information is contained in the WSOP:

1. The logical and physical locations for the block being written, the displacement of the last byte of the file being written and a flag indicating whether this is a synchronous write operation such as all NFS writes are. These fields are filled in by WSOP_START.

2. Information indicating where the mapping pointer was found and the nature of the mapping pointer. A code indicates whether the mapping pointer was filled in as part of mapping for the write or whether it reflects a pre-allocated block. This information is filled in by the mapping routine BMAP_GET1_WRITE to enable WSOP_START to determine what blocks will have to be written during the BLOCK FINISH phase.

3. Information indicating the location and size of any disk area which should be freed at the end of the BLOCK FINISH Phase. When a change in the block map results in previously allocated disk being returned, the new block map must be reliably written to disk before the disk area is returned to the free pool. This is to prevent a situation in which two different block maps point to the same disk location.

4. The size of the file at the start of the write operation. This value is used by BMAP_GET1_WRITE in place of the normal size of the file since the size of a file is only updated at the completion of a batch.

5. Flags indicating what blocks need to be written during the BLOCK FINISH phase and also whether the file size needs to be updated.

6. Flags indicating how the request is to be processed: whether it must be processed alone, whether it is currently part of a batch, or whether it may join a batch at the completion of processing.

In one implementation, a special block mapping routine, BMAP_GET1_WRITE, is called for all block mapping associated with write operations. This routine is passed a WSOP, which is used to control the block mapping process and which receives information needed by WSOP_START to perform its job. The routine BMAP_GET1_WRITE finds the mapping pointer slot, allocating disk and updating the mapping pointer if necessary. It is also capable of allocating and installing mapping pointers in advance when so requested. This is further discussed below in regards to FIG. 3 and in the section on pre-allocation.

The existence of pre-allocation has other implications for BMAP_GET1_WRITE. In the absence of pre-allocation, a block mapping routine can distinguish between blocks new to the file and those never written by the presence or absence of a disk block location in the appropriate mapping pointer slot. Writing to a new logical block causes a new disk block to be allocated and the corresponding mapping pointer filled in. When a new block is allocated in this way, an image of the block completely filled with zero bytes must be installed in the buffer cache so that any non-written portion of the block being modified will be zero, as required by UNIX semantics. In the presence of pre-allocation, however, mapping pointers for blocks never written may be encountered by BMAP_GET1_WRITE. The necessary information regarding which blocks have been written before is maintained externally by the code for the BLOCK START phase and passed to BMAP GET1_WRITE in the WSOP. This information is referred to as the block-coordination information and is maintained in the WRITE STRING. Although it is made necessary by the existence of pre-allocation, it will be more convenient to discuss it under batching.

Another effect of pre-allocation on BMAP GET1_WRITE concerns fragment allocation. Files smaller than 96K may have a last logical block for which a full physical block is not allocated. In the absence of pre-allocation, whether the last block is full can always be determined from the file size. Pre-allocation of a number of full blocks makes it possible for files to end in a full block even though their size would indicate otherwise. The fact that the block is full is an additional piece of state information which are maintained for the file. This bit, the LAST-BLOCK-FULL flag, indicates that the last block of the file was allocated a full block. The combination of the file size and the LAST-BLOCK-FULL flag are referred to as the file-ending information. File ending information exists in the inode in the WRITE STRING and in the WSOP. Each version represents the file end as seen from a different point of view. The copy in the WSOP is used by BMAP_GET-1_WRITE and updated to reflect any change in the LAST-BLOCK-FULL flag as a result of the mapping operation.

The buffer cache code has been enhanced to enable us do the synchronous writes required for NFS operations only when necessary. A new routine, BWRITE IF_DIRTY, finds a specified block in the cache and writes it, synchronously or asynchronously as specified by the caller,if the block is currently in the cache and marked dirty. This allows file system routines to modify blocks in the cache and mark them dirty while noting internally that these modifications must be written to disk before responding. When BWRITE_IF_DIRTY is called, the block need only be written if those modifications have not yet been written. If some other piece of code has written the buffer and made it clean, no additional write has to be executed.

Batching, as illustrated in FIG. 2, provides a means of combining individual requests in response to the client's pattern of I/O activity to provide efficient processing of NFS writes without any change to the client implementation. It does this by forming batches of requests dynamically, allowing new requests to join the batch as long as previous requests have not finished writing their data and only closing the batch when new requests stop appearing. The batching code contains a common set of subroutines to perform the BLOCK START and BLOCK FINISH phases. These routines communicate using fields in the WRITE STRING and the WSOP. The WRITE STRING includes the following data used in handling batching for given file:

1. A PENDING WRITE COUNT: This is a count of the number of requests which are in the BLOCK WRITE phase. A batch begins when this count becomes non-zero. When the count becomes zero a batch becomes closed and can no longer accept new member requests. The request whose transition from the BLOCK WRITE to the BLOCK FINISH phase occasions this closure becomes the leader of the batch and is responsible for executing all the synchronous writes on behalf of the other batch members.

2. Fields giving the locations of all indirect blocks that need to be written at BLOCK FINISH time. Also present is a flag indicating that a synchronous write of the inode is required.

3. A count of the number of batches which have finished execution.

4. Current file size as extended by the batch and the file size when the batch started.

5. A mask of blocks written within the vicinity of the end of the file—the block coordination mask. This information is necessary to determine when blocks to be written must be cleared first because they are being written for the first time and when a write is being executed to a previously written block so that no clear is necessary.

The following discussion provides a simplified outline of write processing in the presence of batching:

1. During the BLOCK START phase, a decision is made whether to process this request within the context of a batch or alone.

2. In either case, information about the state changes caused by the request and the synchronous writes which will be necessary is placed in the WSOP.

3. If the request will be processed as part of a batch, information about the state changes and synchronous writes will be merged into the WRITE STRING to form a combined set of such information for use at the end of the batch.

4. In the case of a request being processed alone, on entry to the BLOCK FINISH phase, the accumulated state changes including updating the file size and all necessary synchronous writes are executed. At this point the operation can enter the completion phase. If it was the result of an NFS request, all necessary preconditions for sending an acknowledgement have been satisfied.

5. If the request is being processed as part of a batch, processing during the BLOCK FINISH phase depends on whether there are other member requests which have not yet entered the BLOCK FINISH phase. If so, the request waits for a batch completion notification before proceeding. The basic rule of batching is that none of the member requests may complete until all of the state modified by any member has been written to disk.

6. If the request is the last member of its batch to enter the BLOCK FINISH phase, it becomes the leader of the batch, responsible for executing the merged status updates and all the required synchronous writes recorded in the WRITE STRING. Once these are executed, the leader and all other members of the batch may enter the completion phase. The other members of the batch are so notified. All of the requests may now send an acknowledgement in the case of NFS requests.

During the BLOCK START phase, a decision is made as to how the request will be processed. This decision depends on the nature of write request and whether a WRITE-STRING exists for the file. If appropriate, a WRITE STRING will be created. A WRITE STRING is created for approximately sequential file-extending writes, and when more than one write is pending for a given file. When the first write becomes pending for a file, the inode and the WSOP are marked WRITE-STRING-PENDING indicating that if a second request arrives a WRITE STRING should be created. The logic proceeds as follows:

1. If no WRITE STRING exists for this file and the inode is marked WRITE-STRING-PENDING, indicating that one write operation is already pending :or this file, a WRITE STRING is created. This WRITE STRING is initialized to inhibit sequential write optimizations because, if the pending write were sequentially file-extending, a WRITE STRING would have already been created in handling that request.

2. If no WRITE STRING exists for this file, and the current write operation is within a given small number of blocks—referred to as the WRITE STRING window—of the current last block of the file, a new WRITE STRING is created. This WRITE STRING will normally be initialized for sequential write optimizations. However, certain considerations may make it advisable to inhibit pre-allocation or inode shadowing in certain cases. In a current implementation, all sequential write optimizations are inhibited on inodes in the root file system, so that an FSCK after a SHUTDOWN command will not conflict with ongoing pre-allocation operations. Additionally, inode shadowing is inhibited if the request which prompts creation of the WRITE STRING is not an NFS request, because, in the case of local requests, the burden of inode shadowing has no corresponding benefit.

3. If a WRITE STRING exists for this file, either because it existed previously or because it was created for this request in one of the two steps above, this operation will join the batch. At the conclusion of the BLOCK START phase, there will be a merge of information about file size updates and data to be written into the WRITE STRING to be acted upon during the BLOCK FINISH phase.

4. If no WRITE STRING exists and the file is being extended, the request is marked HANDLE-ALONE. Requests so marked are handled so as to avoid interference from other requests. A request marked HANDLE-ALONE retains at least a unique lock throughout its processing.

5. If no WRITE STRING exists and the file is not being extended, the WSOP and the associated inode is marked WRITE-STRING-PENDING. A request so marked is one that would be an acceptable member of a batch, except that neither of the events that would trigger creation of a WRITE STRING have occurred. Instead, the system is configured so that if another request arrives while this one is pending a batch will be created in such a fashion that the pending request will be established as a charter member of the new batch. The merge for the pending request will occur on entry to the BLOCK FINISH phase.

Once the decision as to the basic mode of processing the request is executed, the block mapping operation is executed. The result of the block mapping operation is information in the WSOP indicating what disk writes must be executed during the BLOCK FINISH phase to satisfy the protocol requirements for this request. If a WRITE STRING exists, this information will be merged into it, transferring the responsibility for executing these writes from the individual request to the batch as a whole.

Joining a batch generally occurs during the BLOCK START phase but can be executed during the BLOCK FINISH phase for a WRITE-STRING-PENDING request. The logic proceeds as follows:

1. If no batch yet exists, a new batch is created. This is executed in the routine WSB_START.

2. The WSOP's file-ending information is updated from that in the WRITE STRING. This is so that when the WSOP is passed to BMAP_GET1_WRITE it will reflect all writes that have gone through the BLOCK START phase. Note that since the BLOCK START phase is executed with at least a unique lock, this is well defined.

3. Based on the WRITE STRING's block coordination mask, a flag is set in the WSOP indicating whether this block is being written for the first time. This flag is used by BMAP_GET1_WRITE to determine whether the block needs to be cleared.

4. If this is a WRITE-STRING-PENDING request, the WRITE-STRING-PENDING flag is turned off and the process exits. This is because some of the work of joining the batch has already been executed on the current request's behalf when the batch was created.

5. Otherwise, the I/OSTRING HOLD COUNT and the PENDING WRITE COUNT are incremented. The HOLD COUNT assures that the I/OSTRING will not be de-allocated during the pendency of the current request and the increment to the PENDING WRITE COUNT indicates that there is another request which has yet to reach the BLOCK FINISH phase.

As stated above, creating a new batch is executed in the routine WSB_START, as follows:

1. All fields in the WRITE STRING that apply only to the current batch are initialized.

2. Fields relating to the blocks which have to be written are cleared. When a batch starts, nothing yet needs to be written.

3. File-ending information is copied from the version in the inode into the WRITE STRING. The version in the WRITE STRING will be updated as each successive request in the batch goes through the BLOCK START phase.

4. Block coordination information is initialized. A base block is selected and the mask of written blocks is cleared.

5. A partial join is executed on behalf of a WRITE-STRING-PENDING request. If WRITE-STRING-PENDING flag is detected in the inode, the systems resets the flag, and I/OSTRING HOLD COUNT, and the pending I/O count, to reflect the WRITE-STRING-PENDING request. That request will complete the join operation and do the merge when it enters the BLOCK FINISH phase.

Block mapping, as discussed herein, involves two items. The first—block mapping proper—is executed by BMAP_GET_WRITE. Using information placed in WSOP by WSOP_START, BMAP_GET_WRITE finds the appropriate mapping pointer, allocates disk if necessary, installs a clear block for newly written disk if necessary, updates the WSOP to reflect a change in the file-ending information and records in the WSOP how the mapping was executed and notes if the inode needs to be written synchronously. After BMAP_GET_WRITE returns, WSOP_START uses the information returned in the WSOP to determine which blocks must be synchronously written. This determination depends on where the mapping pointer was found, inode or indirect block, and the state of the mapping pointer when encountered, whether it represented a block previously written, a block just allocated by BMAP_GET_WRITE, or a pre-allocated block. The goal is to be strictly correct in providing statelessness for NFS, even in the face of a mixture of local and remote writes to the same file (existing implementations fail in this regard), while not burdening the local case.

In the case of a mapping pointer found in the inode the system proceeds as follows:

1. If the mapping pointer was for an existing block, the system has a synchronous operation and the block map in the inode is dirty (as reported by the ICHG bit discussed below). The system marks the WSOP so the inode will get written synchronously. This is because a local request may have allocated the block and left the inode still dirty. For NFS, the system must write the inode before responding.

2. If the mapping pointer was empty and a block allocated then the system must write the inode synchronously if there is a synchronous request.

3. If the mapping pointer was one set by pre-allocation and the operation is synchronous, the inode must be written synchronously if the WRITE STRING indicates that some pre-allocation for this file has been executed by a non-synchronous operation. In any other case, the pre-allocation logic takes care of causing the inode to be written.

In the case of a mapping pointer found in an indirect block the logic is somewhat different, in view of the routine BWRITE_IF_DIRTY:

1. If the mapping pointer is not due to pre-allocation and a synchronous request is pending, the current indirect block is recorded as needing to be written at BLOCK FINISH time. Because this is executed using BWRITE_IF_DIRTY, the system can properly deal with the case of a block allocated by a local request without worrying about unnecessary disk writes.

2. If the mapping pointer is due to pre-allocation and the system has a synchronous request, the system may have to write the indirect block synchronously. Normally, this does not have to be executed, since pre-allocation logic (described below) takes care of writing the modified indirect blocks ahead of time. If, however, the WRITE STRING indicates that pre-allocation was executed by a local request, or if there is no WRITE STRING, the system schedules the indirect block for writing.

Merging into a batch can only be executed once the block mapping process has made available information on the synchronous writes which will have to be executed and any file-ending information. Generally this is executed at the end of the BLOCK START phase, but for a WRITE-STRING-PENDING request it is executed on entry to the BLOCK FINISH phase.

Merging is executed by the routine WSB_MERGE. Its main job is to update the WRITE STRING to reflect information stored into the WSOP by BMAP_GET_WRITE. It also is responsible for maintaining the block coordination mask. It proceeds as follows:

1. Any indirect block marked in the WSOP as requiring a synchronous write is merged into the WRITE STRING. The WRITE STRING contains an array of block locations for this purpose. In many cases the block to be merged was already recorded by a previous operation so no change occurs. In the event that there is insufficient space in the WRITE STRING's array to record all of the indirect blocks, this part of merge fails and the WSOP is marked to indicate that this request must write out its own indirect block rather than relying on the batch. The array is made large enough that the expected performance impact of this exception is suitably small.

2. If the inode must be written for the current request, the corresponding flag must be set in the WRITE STRING. In many cases, it would have already been set by a previous request in the same batch.

3. If the current request is one which increases the size of the file, the WRITE STRING is modified to reflect the new size. This includes marking the batch as one which extends the file, updating the current size and LAST-BLOCK-FULL flag.

4. If the current request writes beyond the size of the file at the start of the batch and is synchronous, the batch must be marked as requiring a synchronous write of the inode. Note that such a request might not increase the size of the file since an earlier request in the batch may have extended the file even more, leaving the current request earlier in the file than the new file size.

5. The block coordination information is updated. This information is in the form of a mask of logical blocks written within a window starting as the block-coordination base selected at initiation of the batch. Since the block coordination is necessary to resolve ambiguities for BMAP_GET1_WRITE when encountering mapping pointers for pre-allocated blocks, if a write occurs outside of the region covered by the mask, pre-allocation must be shut down to prevent any harmful ambiguities from arising. This is discussed in more detail in the section on pre-allocation.

Handling for the BLOCK FINISH phase is controlled in WSOP_FINISH. There are three main types of handling:

1. Requests handled alone do their own size updates and synchronous writes. These operations are executed with a unique lock held.

2. Requests which are part of a batch but requests wait for a batch completion signal from the leader. whose entry into the BLOCK 3. Requests FINISH phase marks the closing of batch membership giving them the role of leader of the batch. The leader of the batch is responsible for executing the size update and synchronous writes and then signalling the other members of the batch that they can continue.

The first part of the task of routine WSOP_FINISH is to determine which of the three cases applies to the current request. This is executed as follows:

1. If the request is WRITE-STRING-PENDING, the system obtains a unique lock for the inode and then checks the inodes WRITE-STRING-PENDING flag which is turned off when the WRITE STRING is created. If that flag is still on, the system turns it off and marks this request to be processed alone. Otherwise, the system drops the unique lock in favor of a shared lock, the normal locking level for a request which is a member of batch.

2. If the request was marked for processing alone, either at BLOCK START time or just now, the system processes it as outlined below. otherwise, it is a member of a batch and it is handled as one of the two latter cases.

3. If the request is marked WRITE-STRING-PENDING, the system now formally consolidates the batch and merges the information into it. Note that the current call to WSB_JOIN does not update the HOLD COUNT and pending I/O count since these were updated when the WRITE STRING was created.

4. If the request is marked as having to write its own indirect block because of an overflow in the WRITE STRING array, that block is written synchronously before proceeding on to the rest of the BLOCK FINISH phase.

5. The pending I/O count is now decremented. If this is non-zero, this request cannot be the leader of the batch.

6. If the system decremented the count to zero, the locking level must be advanced from shared to unique, since the actions of the leader require a unique lock. Note that by getting a unique lock the system enters a state in which no new member can join the batch since the BLOCK START phase is executed with at least a unique lock. However, obtaining a unique lock may necessitate a delay which can allow new requests to join the batch. Therefore if the pending I/O count was decremented to zero, it is re-incremented before obtaining the unique lock and then decremented again once the lock is obtained. If the count is decremented to zero with a unique lock held, this confirms the request as the leader of the batch. As long as the leader holds the unique lock, no new requests can join the batch. Once the leader releases it, a new batch can form.

For a request processed alone, the following actions are executed to complete the BLOCK FINISH phase:

1. Update the file end information in the inode as indicated in the WSOP.

2. Write any modified indirect block using BWRITE-IF-DIRTY.

3. Write the inode synchronously if the WSOP indicates this is necessary.

4. Free any disk area whose location is recorded for release in the WSOP.

5. Release the unique lock unless WSOP_FINISH's caller has requested otherwise.

For requests processed as a part of a batch, the following actions are executed (although some actions differ between leader and non-leader requests, most of the handling is similar):

1. Determine leadership and do other preparatory actions as outlined above.

2. For a request which is not the leader, wait for a signal from the leader and the batch finish count to be incremented. Once this is executed, the batch is finished and the system can release the shared lock on the inode and proceed to the common actions below.

3. For a request which is the leader, the file ending updates and synchronous writes are executed as outlined below. The batch finish count in the WRITE STRING is updated and waiting batch members are awakened.

4. Any disk area whose location is recorded in the WSOP is now freed.

5. The I/OSTRING is released, decrementing its HOLD COUNT and allowing it to be de-allocated if desired.

6. The error code taken from the WRITE STRING is returned to WSOP FINISH's caller. This mechanism allows write errors encountered by the leader to be reflected in the handling of all members of the batch. This is important since responding indicating success when some part of the associated state could not be written to disk is a protocol violation.

For requests which are batch leaders, the following is a simplified version of their actions on behalf of the other members of the batch performed in WSB_LEADER:

1. Update the file end information in the inode as indicated in the WRITE STRING.

2. Write each modified indirect block recorded in the WRITE STRING using BWRITE_IF_DIRTY.

3. Write the inode synchronously if the WRITE STRING indicates this is necessary.

Pre-allocation, as discussed with respect to FIG. 3, aims to allocate a number of blocks following the last block of the file in anticipation of subsequent use eliminating the writes of indirect blocks which would be necessary for each batch in which a new mapping pointer was filled in. Pre-allocation executes within the context of the batching code. For pre-allocation to be in effect, there must be a WRITE STRING for which sequential write optimizations have not been inhibited. The WRITE STRING includes the following information devoted to pre-allocation:

1. The logical block number of the first block pre-allocated during the current batch, the pre-allocation start block.

2. The logical block number of the block beyond the last one pre-allocated, the pre-allocation limit block.

3. Limits, in terms of logical block numbers, defining a range of logical blocks, the occurrence of a write within which, will trigger further pre-allocation, the pre-allocation trigger range.

4. Physical location of an indirect block which has been made dirty within the current batch by installing mapping pointers for pre-allocated blocks, the dirty pre-allocation indirect location.

Implementation of pre-allocation occurs at a number of points within the framework of a batch, as follows:

1. When a WRITE STRING is created because of a write in the vicinity of the end of the file, the pre-allocation trigger range is set to include the block being written.

2. When a batch is created, WRITE STRING fields limited to the current batch must be initialized.

3. When a request joins a batch, a check is made to see if the block is within the range to trigger further pre-allocation.

4. When block mapping is to be executed, if more pre-allocation is desired, BMAP_GET1_WRITE is passed a pre-allocation Control structure (PAC) which indicates for which logical blocks it is to do pre-allocation.

5. When executing a request merge, if pre-allocation was executed, the WRITE STRING must be updated to reflect the new range of pre-allocated blocks. Additionally, if a block is written beyond the area that can be monitored by the block coordination information, part of the pre-allocation must be cleared.

6. When the leader is updating the file size, any holes within the area being added to the file must have the mapping pointers for the pre-allocated areas cleared.

7. When the leader is writing indirect blocks, special account must be taken of indirect blocks made dirty by pre-allocation.

8. Under a number of situations, pre-allocation must be shut down.

Throughout execution of a batch, the code looks for situations indicating that the access pattern is not sequential. When this happens, the pre-allocation trigger range is made invalid to inhibit subsequent pre-allocation and the WRITE STRING marked for shutdown of sequential write optimizations.

The leader checks for this shutdown indication before executing his synchronous disk writes and calls WSSW_SHUT to effect it. WSSW_SHUT shuts down all pre-allocation and turns off inode shadowing.

WSSW_SHUT is also called whenever an attempt is made to de-allocate a WRITE STRING.

When a write is within the pre-allocation trigger range, a PAC is passed to BMAP_GET1_WRITE containing a count of blocks to allocate and a displacement, from the current block being written, of the first mapping pointer for which pre-allocation is to be executed. A negative displacement will occur when the write which causes a WRITE STRING to be created does not immediately abut the existing blocks of a file. For example, if the first write the system receives for a new file is for logical block five, the initial call to BMAP_GET1_WRITE will specify a displacement of minus five so that block allocation will be executed in advance for locks zero through four on the assumption that will soon be forthcoming, probably within the current batch.

After BMAP_GET1_WRITE gets access to the area, either inode or indirect block, in which the mapping pointer for the current block is located, pre-allocation, if requested, is performed. Actual disk allocation is executed by the routine DISKALLOC_PRE which efficiently processes the allocation of multiple disk blocks for pre-allocation, returning with less than the requested number if blocks are not currently available. Pre-allocation is limited to the current mapping area. If the number of blocks requested spills over into a subsequent indirect block, only as many blocks as are required to fill up the current mapping area are obtained. The number of blocks actually pre-allocated is returned in the PAC.

Merging of pre-allocation information is executed in the routine WSPA_MERGE. It has two major functions: to update the WRITE STRING to reflect the existence of any pre-allocation executed and to update the pre-allocation trigger range after any attempt at pre-allocation even if there was no pre-allocation executed. Updating the WRITE STRING to reflect pre-allocation executed proceeds as follows:

1. If there has been no pre-allocation previously executed in the current batch, the pre-allocation start block takes on the value of the pre-allocation limit block.

2. The pre-allocation limit block is incremented to reflect the number of blocks pre-allocated.

3. If the current request is not synchronous, a flag in the WRITE STRING is set indicating that this file may have pre-allocated mapping pointers which have not been forced to disk. Nothing more needs to be executed for a non-synchronous write.

4. Otherwise, If the mapping pointer for the current block, and therefore for all pre-allocation, was in the inode, the system indicates that the inode must be written synchronously at the end of the batch.

5. If the mapping pointer was in an indirect block, the system will record that indirect block to be written at the end of the batch, preferably as the dirty pre-allocation indirect location which will allow it to be written asynchronously. If the dirty pre-allocation indirect block location matches the current indirect block location nothing need be executed. If the dirty pre-allocation indirect location is empty, it is initialized to the location of the current indirect block. Otherwise, the system attempts to move the dirty pre-allocation indirect location to the table of dirty indirect blocks. If this succeeds, the system moves current indirect block location to the slot for the dirty pre-allocation indirect location which is now free. If the system failed because the table of indirect locations was full, the WSOP is marked to force the current request to write his own indirect block on entry to the BLOCK FINISH phase.

Setting of the pre-allocation trigger range is executed every time the system attempts pre-allocation, even if no blocks were pre-allocated. The system will set the window so that it will preallocate blocks in advance of need, allowing asynchronous writing of the dirty indirect block. Conversely, needless pre-allocation is avoided. The process uses the WRITE STRING window, the number of blocks beyond the current file size considered as approximately sequential to control the process, as follows:

1. If the number of blocks pre-allocated is less than the WRITE STRING window, then the system cannot keep a large number of blocks ahead of writing, probably because of an indirect block boundary. The trigger range is set to start just beyond the last block pre-allocated and run for a number of blocks equal to the WRITE STRING window.

2. If the number of blocks pre-allocated is greater than or equal to the WRITE STRING window, the trigger range is set to end at the last block pre-allocated. The size of the trigger range is set to be between one and two times the window size with an effort made not to include within the range any block within the WRITE STRING window of the block currently being written.

If a request extends the file beyond the region represented by the block coordination mask, special action needs to be taken during the BLOCK START phase if pre-allocation is in effect. Since the logic for determining where holes exist at the end of a batch and the logic for determining when a pre-allocated block must be cleared depend on this mask to record what blocks have been written, the system must undo any pre-allocation beyond the block coordination area. Any pre-allocation beyond the current last block of the file and beyond the area represented by the block coordination mask is cleared with the exception of the block being currently written. The system also marks the WRITE STRING to turn off all sequential write optimizations at the end of the current batch.

When the system determines that a file has been extended during the current batch and pre-allocation is in effect, the system must check for any holes in the area between the old last block of the file and the new before updating the file size. Any holes in this area are required by UNIX semantics to appear as zero bytes. Until the file size is updated, blocks subsequent to the old file size cannot be seen by other requests. Once the file size is updated, any blocks not written must have a zero mapping pointer or zero data in the disk block pointed to by a real mapping pointer.

To find out if there are any holes the area being added to the file, the system uses the block coordination mask and compares it to a full mask constructed to contain a bit for every block in the range of blocks added to the file. If these are not equal, the system must eliminate pre-allocation for any holes in the area. The system also may decide to shut down sequential write optimizations if the pattern of approximately sequential file extension is not being maintained. The process proceeds as follows:

1. The total size of all holes in the file is computed. If this exceeds the WRITE STRING window, the WRITE STRING is marked for shutdown of sequential write optimizations.

2. If the file is being extended beyond the area pre-allocated the WRITE STRING is also marked for shutdown of sequential write optimizations.

3. Pre-allocation mapping pointers for holes are cleared and the associated disk de-allocated by calling BMAP_PACLEAR. The area to be cleared begins just past the old last block in the file and ends either at the new last block of the file or, if the WRITE STRING is marked for shutdown of sequential write optimizations, at the end of the pre-allocation area. Blocks marked in the block coordination mask as having been written during the current batch are exempted from the clear.

When the system clears pre-allocation for holes in the area extended but does not shutdown sequential write optimizations, the system expects that the blocks left as holes in the current batch will be received in subsequent batches. Disk allocation routines will use the mapping pointers around that for the hole to select a disk location to attempt to allocate first, the preference, when the hole is filled in. The result is that subsequent logical blocks in the file will tend to be physically contiguous. In the standard Fast File System implementation only the immediately preceding logical block is considered in formulating a preference. This will result in inferior performance in recovering from holes in pre-allocation and in laying out files written remotely when pre-allocation cannot be executed.

When writing its dirty blocks, WSB_LEADER takes special account of indirect blocks made dirty by pre-allocation. The goal of the logic is to pre-allocate in advance so that the pre-allocation indirect can be written asynchronously at the end of the batch. When the next request is received, the system may have to wait for this write to complete before getting access to that indirect block. However, the system has the advantage of overlap between the write and the network turn-around between sending the response and getting the next request. The logic is as follows:

1. If there is a pre-allocation indirect block recorded in the WRITE STRING and the file's size extends into the area pre-allocated by this batch, the pre-allocation indirect block must be written synchronously before responding. The synchronous write is executed and the dirty pre-allocation indirect location zeroed.

2. Other dirty indirect blocks are written as previously discussed. If these include the block written above, BWRITE_IF_DIRTY will find the block clean and do nothing.

3. The inode is written synchronously as previously discussed.

4. If there is a pre-allocation indirect block recorded in the WRITE STRING, an asynchronous write will be scheduled for this block before responding. This is done using BWRITE_IF_DIRTY so if it was written synchronously above no I/O will be executed.

The routine BMAP_PACLEAR is used whenever it is necessary to clear pre-allocated mapping pointers. This may occur in a number of situations:

1. When a write is made beyond the block coordination area.

2. When size is being updated by the leader and holes are found in the area being added to the file.

3. When pre-allocation is being shut down.

BMAP_PACLEAR is passed the starting and ending logical block numbers for the mapping pointers to clear together with a bit mask and a starting logical block number to which the bit mask applies. The bit mask specifies a set of mapping pointers within the range specified for clearing that are not to be cleared. This allows BMAP_PACLEAR to be used to clear the mapping pointers for holes detected using the block coordination mask.

For each area in which the range of mapping pointers occurs, either inode or indirect block, the area is read and the mapping pointers not in the bit mask cleared. After the inode or indirect block is written synchronously, the blocks are de-allocated and the allocated block count in the inode updated.

Throughout execution of a batch, the code looks for situations indicating that the access pattern is not sequential. When this happens, the pre-allocation trigger range is made invalid to inhibit pre-allocation and the WRITE STRING marked for shutdown of sequential write optimizations.

The leader checks for this shutdown indication before executing his synchronous disk writes and calls WSSW_SHUT to effect it. WSSW_SHUT shuts down all pre-allocation and turns off inode shadowing. WSSW_SHUT is also called whenever an attempt is made to de-allocate a WRITE STRING. When shutting down pre-allocation, BMAP_PACLEAR is used to clear all the mapping pointers past the end of the file. If the file's LAST-BLOCK-FULL flag is set, BMAP_RLSFRAG is called to de-allocate the fragments which ordinarily would not be part of the file. In a number of situations it is advisable to undo pre-allocation in effect due to circumstances not connected with the stream of NFS write requests. This can be implemented by specifically providing an interface for this purpose, but is most conveniently done by providing a mechanism to de-allocate all I/OSTRINGS associated with a given inode. It is useful to do this when removing a file or when closing a file with LINK COUNT zero in order to quickly free up needed disk space. Additionally, it is useful to de-allocate I/OSTRINGS associated with inodes on file system for which an attempt to unmount is being made. As was previously discussed in relation to FIG. 4, the shadow inode logic aims to eliminate inter-cylinder-group SEEKs which occur as a result of writing a file's inode synchronously. To do this, a shadow inode is assigned in a convenient cylinder group where modified size and other inode data can be written to it without a long SEEK. The file's normal inode remains in its normal location but need not be updated to reflect every state change caused by an NFS request. In the event of a system failure, FSCK will use the shadow inode to update the main one. The shadow inode logic executes within the context of the batching code. For us to use a shadow inode, there must be a WRITE STRING for which sequential write optimizations have not been inhibited. The WRITE STRING contains the following information devoted to the shadow inode logic:

1. A designation of the location of a shadow inode or zero if the system does not have one. This is in the form of an I-NUMBER which gives an index into the disk array of inodes.

2. The inodes are stored non-contiguously with a contiguous section of inodes within each cylinder group.

3. Cylinder group number in which the last block of the file is located. When the last block of the file has not been written under control of the WRITE STRING, this value is a minus one indicating that the true value is unknown.

There is also a flag in the inode structure in memory which is set if the process has a shadow inode. This is used so IUPDAT, the system's inode write routine does not need to look for a WRITE STRING when there is no shadow inode. Implementation of the shadow inode logic occurs at a number of points within the framework of the batching code, as follows:

1. When a WRITE STRING is created, the last block cylinder group is initialized to minus one.

2. When executing a merge for a request which extended the file, the last block cylinder group is updated to reflect the location of the new last block.

3. When the leader is executing a synchronous write of the inode, the shadow inode must be released, created, or shifted to a new cylinder group as appropriate.

4. When writing an inode, IUPDAT must write synchronously to the shadow if present and update the image of the main inode in the buffer cache.

5. When WSSW_SHUT is called, because of a non-sequential I/O pattern the shadow inode must be released.

6. When halting the system, all pending updates must be made to the main inodes and the shadow inodes de-allocated. This is executed by de-allocating all I/O-STRINGs as a part of the REBOOT system call.

7. The file-checking program FSCK, when scanning the inodes of a file system, must make the updates indicated by the shadow inodes.

In order to enable shadow inodes to be found and associated with the proper home inodes, a set of rules for the appearance of inodes on disk are followed. Because space in the inode on disk is scarce, the system is not able to have the home inode point to the shadow. The rules are as follows:

1. Home inodes for which shadow inodes may exist are marked as possibly having a shadow inode by means of a special value in the file mode field. This value only appears on disk and is replaced by the normal value for a regular file when the inode is in the inode cache. The special value allows FSCK not to act on inodes that may be superseded by shadows during his first pass.

2. Shadow inodes have another distinctive value in their mode field to mark them and use the I_BLOCKS field to contain the I-NUMBER of the corresponding home inode. With the exception of the generator field which retains the value associated with the shadow I-NUMBER, the rest of the inode is an image of the home inode.

3. To deal with errors in writing which leave open the theoretical possibility that the system may have more than one shadow or a shadow which is outdated, the precedence among inodes is based on the inode WRITE COUNT. The WRITE COUNT is a monotonically increasing quantity maintained in the file system to support on-line backup. Any other quantity that a given file system guaranteed as monotonically increasing during the life of a file could be used similarly. If two inodes ostensibly represent the same home inode, the one with the higher WRITE COUNT is assumed definitive. If two have the same WRITE COUNT, a shadow is assumed to have precedence over a home inode.

When WSB_LEADER needs to synchronously write a file's inode, he computes the cylinder group number of the file's home inode and fetches from the WRITE STRING the current cylinder group number, the cylinder group number of the last block in the file. If this is not known, the home cylinder group number is used instead. The system then proceeds to write the inode as follows:

1. If the current cylinder and home cylinder group are equal, the inode should be written to its home s the shadow and SHIN_RLS is called which synchronously write the home inode. Otherwise IUPDAT is called to write the home inode.

2. If the current cylinder group is different from the home cylinder group and the system either has no shadow or has a shadow in a different cylinder group SHIN_SHIFT is called to move the shadow to the current cylinder group, de-allocating any old shadow if present.

3. If neither of the above cases applies, IUPDAT is called to write the inode to the shadow location, if present, and the home location otherwise.

The system's inode write subroutine, IUPDAT, is used to write inodes modified in the inode cache to the buffer cache or to disk. It may be called specifying synchronous or asynchronous update of disk. When the asynchronous option is specified, the inode is copied into the appropriate block in the buffer cache and no disk I/O executed. The synchronous option results in a synchronous write of the disk block containing the specified inode before returning.

On all calls to IUPDAT, whether from the write code or otherwise a check is made for a shadow inode. The logic is as follows:

1. If none of the inode dirty bits, ICHG, IACC, IUPD, is on, IUPDAT just returns. Otherwise, these bits are turned since the result of the IUPDAT is to make the in-core inode no longer dirty, at least from the buffer cache's point of view.

2. If the current request is synchronous and a shadow inode is present then the shadow inode is synchronously written. The option flag is then changed to indicate asynchronous so that no I/O is executed to the main inode.

3. The inode is copied from the inode cache to the home inode slot in the buffer cache. If the option flag indicates a synchronous update, a synchronous write is executed in the block containing the home inode.

To eliminate a shadow inode, the routine SHIN_RLS is used. An up-to-date version of the home inode is written and the shadow inode cleared and de-allocated. The routine operates as follows:

1. The flag indicating a shadow inode present, ISHADOW, is cleared.

2. The system calls IUPDAT to write an updated version of the home inode after setting ICHG to force a disk write. Because ISHADOW has been cleared, the version on disk will indicate that no shadow inodes are present.

3. The shadow inode is cleared and de-allocated. The inodes WRITE COUNT is incremented if the shadow could not be cleared on disk.

4. The shadow inode I-NUMBER is cleared in the WRITE STRING.

To specify that a shadow inode be placed in a particular cylinder group, a routine referred to as SHIN_SHIFT is used. It creates a new shadow inode in the specified cylinder group and deletes any existing one. This routine operates as follows:

1. The system attempts to find an available inode in the selected cylinder group using the routine IALLOCCG. If none is available, the system calls IUPDAT to write the current inode (shadow or home) synchronously and return. The caller does not depend on moving or creating a shadow inode but does assume that an updated inode does get written.

2. If a shadow did not exist previously, the system writes the home inode with the mode indicating that a shadow may exist.

3. The inode and WRITE STRING are updated to reflect the new shadow. IUPDAT is called again to write the shadow inode synchronously to disk.

4. If a shadow inode existed previously, it is cleared and de-allocated. The inodes WRITE COUNT is incremented if the shadow could not be cleared on disk.

During pass one of FSCK, information in shadow inodes is merged into home inodes and the shadow inodes cleared and de-allocated. Once an updated version of a home inode has been produced it can be scanned as part of normal FSCK pass one processing. As the system scans through the inodes, the system maintains the following information for each home inode for which there is or may be a shadow:

1. The I-NUMBER of the home inode.
2. The WRITE COUNT seen in the home inode.
3. The image of the inode representing the home inode that has the highest precedence and the I-NUMBER of that inode. This may be the home inode or a shadow.
4. A flag indicating whether the home inode has been seen.

As the system scans the inodes, it takes special action on encountering shadow inodes or home inodes marked as having associated shadows. The logic is as follows:

1. The system scans for a matching entry in the table using the home inode numbers as a key.
2. If no entry is found, the system creates one.
3. Otherwise, a comparison is made of the precedence of the inode in the table and inode being scanned. If the inode being scanned is of higher precedence than in the table, it will replace it in the table. A shadow inode which is being superseded, whether scanned or in the table, is cleared on disk and de-allocated.
4. No inode in this class is acted on by FSCK's normal pass one logic during this phase since they may be superseded later in the scan.

When scanning inodes, FSCK compares creation time as recorded in shadow inodes and their putative home inodes. This enables out-of-date shadow inodes which result from disk I/O errors to be detected and ignored. File creation time is conveniently used because it is maintained by the file system, but any other field guaranteed by the file system to be different in different files which bear the same inode number can be used instead.

Once the scan is complete, FSCK goes through the table and processes the inodes as found in the table. Each entry is checked for the flag indicating that the home inode has been seen. If this flag is off, then the shadow inodes are matched with a home inode which is marked as not having shadows, indicating that the shadows are out of date. In this case, the system clears and de-allocates the pending shadow. Otherwise, the up-to-date inode image from the table is written to the home inode location with I_BLOCKS computed from the file's block map. The shadow is cleared and de-allocated if a shadow was the version with the highest precedence.

It will thus be seen that the invention efficiently attains the objects set forth above, among those made apparent from the preceding description. More particularly, in contrast with conventional NFS-based configurations, which have typical write speeds on the order of 50–100 kilobytes/second, the invention enables a client system to execute NFS write operates at rates of 200–400 kilobytes/second. Moreover, this two- to eight-fold advantage is attained without the use of battery-backed RAM or other additional hardware, and the attendant cost and complexity of such additions.

It will be understood that changes may be made in the above-described construction and in the foregoing sequences of operation without departing from the scope of the invention. For example, while the system described above has been implemented on a network utilizing UNIX in the context of the NFS protocol, the invention can also be practiced advantageously in other environments in which similar speed-related issues arise.

It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. In a method for operating a digital data processing system in a stateless protocol environment, said digital processing system including
   at least one file server for storing and providing selective access to digital data files, and
   at least one client device, coupled to and communication with said file server,
   said at least one client device including
      request means for generating a request to write data to at least a selected one of said digital data files,
   said file server including
      inode means for storing an informational status associated with at least selected ones of said digital data files,
      indirect block means for storing a data file extension pointer associated with at least selected ones of said files,
      response means for responding to said write request by executing
         (i) a write operation to write data associated with said request to said selected digital data file,
         (ii) an update operation for updating, in connection with said write operation, at least one of said inode means and indirect block means associated with said file, and
         (iii) an acknowledgement operation for acknowledging, to said client device, said write request, only after completion of said associated write and update operations,
   the improvement comprising the steps of
   A. detecting, in said file server, multiple simultaneously pending write requests received from one or more of said client devices and directed to said selected digital data file,
   B. combining those multiple simultaneously pending write requests to eliminate at least one of said write and update operations associated therewith,
   C. said combining step including the further steps of
      i) determining at least one of an informational status and a data file extension pointer associated with said selected file that will result from responding to a plurality of said pending write requests, ii) executing at least one write operation to write data associated with said plurality of pending write requests, and iii) executing an update operation for updating at least one of said inode means and said indirect block means associated with said selected file, to include said informational status and said data file extension pointer in accord with said determining step, D. executing an acknowledgement operation, acknowledging to said one or more client devices completion of said pending write requests, only after completion of said combining step, in accord with said stateless protocol.

2. A method according to claim 1, the further improvement wherein said detecting and combining steps collectively include the steps of commencing execution of at least a first pending write request, wherein said commencing includes executing at least one write operation corresponding at least to said first pending request, and testing for additional pending write requests upon completion of said write operation.

3. A method according to claim 1, the further improvement comprising the step of executing said combined write requests in a batch operation.

4. In a method according to claim 1 wherein said file server further includes data storage means including a plurality of storage locations for storing each of said digital data files in plural ones of said storage locations particularly allocated to each of said digital data files, and the further improvement comprising the steps of A. detecting a plurality of pending write requests directed to substantially sequential ones of said storage locations already allocated to said data file, B. pre-allocating, in response to said detection of said pending write requests directed to substantially sequential storage locations, a selected number of storage locations following a last storage location of said selected digital data file in anticipation of subsequent write requests directed to those newly pre-allocated storage locations, wherein said selected number of storage locations is larger than would otherwise be necessary to write data associated with said pending write requests directed to substantially sequential storage locations, and C. wherein said pre-allocating includes the additional steps of i) executing a determining step to determine at least one of an informational status and a data file extension pointer associated with said selected digital data file that will result from extending said selected data file by said selected number of storage locations, and ii) executing an update operation for updating at least one of said inode means and said indirect block means associated with said selected digital data file, to include said informational status and said data file extension pointer of said determining step, and D. executing at least one write operation and at least one acknowledgment operation associated with said pending write requests directed to substantially sequential storage locations.

5. A method according to claim 4, the further improvement comprising the step of maintaining a first bit mask, said first bit mask including a set of bits, said set being representative of written storage locations in said selected data file, said written storage locations being bounded by a first written storage location and a last written storage location.

6. A method according to claim 5, the further improvement wherein said maintaining step includes the step of maintaining a second bit mask, said second bit mask including a set of bits representative of said storage locations pre-allocated to said selected data file, said pre-allocated storage locations being bounded by a first pre-allocated storage location and a second pre-allocated storage location.

7. A method according to claim 6, the further improvement comprising the steps of A. comparing said first and second bit masks to determine which of said storage locations pre-allocated to said selected data file have not been written to, and B. writing zeros to said unwritten storage locations in a storage region between said first written storage location and said last written storage location.

8. A method according to claim 6, the further improvement comprising the steps of A. detecting substantially non-sequential write requests, received subsequent to said pre-allocation, and B. responding to said non-sequential write requests by inhibiting further pre-allocation.

9. A method according to claim 8, further improvement comprising the steps of

A. following detection of said non-sequential write requests, reading said first and second bit masks, B. comparing said first and second bit masks to detect storage locations pre-allocated to said selected data file while have not been written to, and C. de-allocating, in response to said detection of said non-sequential write requests, storage locations, in a storage region between said last written storage location and said last pre-allocated storage location, D. executing a determining step to determine at least one of an informational status and a data file extension pointer associated with said selected data file resulting from said de-allocating, and E. executing an update operation for updating at least one of said inode means and said indirect block means associated with said selected data file, to include said informational status and said data file extension pointer in accord with said determining step.

10. In a method for operating a digital data processing system in a stateless protocol environment, said digital processing system including at least one file server for storing and providing selective access to digital data files, and at least one client device, coupled to and in communication with said file server, said at least one client device including request means for generating a request to write data to at least a selected one of said digital data files, said file server including data storage means including a plurality of storage locations for storing each of said digital data files in plural ones of said storage locations particularly allocated to each of said digital data files, inode means for storing an informational status associated with at least selected ones of said digital data files, indirect block means for storing a data file extension pointer associated with at least selected ones of said files, response means for responding to said write request by executing (i) a write operation to write data associated with said request to said selected digital data file, (ii) an update operation for updating, in connection with said write operation, at least one of said inode means and said indirect block means associated with said file, and (iii) an acknowledgment operation for acknowledging, to said client device, said write request, only after completion of said associated write and update operations, the improvement comprising the steps of A. detecting a plurality of pending write requests directed to substantially sequential ones of said storage locations already allocated to said data file, B. pre-allocating, in response to said detection, a selected number of storage locations following a last storage location of said data file in anticipation of subsequent write requests directed to those newly pre-allocated storage locations, wherein said selected number of storage locations is larger than would otherwise be necessary to write data associated with said detected pending write requests, C. said pre-allocating including i) determining at least one of an informational status and a data file extension pointer associated with said selected data file that will result from extending said data file by said selected number of storage locations, and ii) executing an update operation for updating at least one of said inode means and said indirect block means associated with said data file, to include said informational status and said data file extension pointer of said determining step, and D. executing at least one write operation and at least one acknowledgement operation associated with said pending write requests.

11. A method according to claim 10, the further improvement comprising the steps of A. detecting substantially non-sequential write requests, received subsequent to said pre-allocation, and B. responding to said non-sequential write requests by inhibiting further pre-allocation.

12. A method according to claim 11, the further improvement comprising the step of maintaining a first bit mask including a set of bits, said set being representative of written storage locations in said selected data file, said written storage locations being bounded by a first written storage location and a last written storage location.

13. A method according to claim 12, the further improvement wherein said maintaining step includes the steps of maintaining a second bit mask, said second bit mask including a set of bits representative of said storage locations pre-allocated to said selected data file, said pre-allocated storage locations being bounded by a first pre-allocated storage location and a second pre-allocated storage location.

14. A method according to claim 13, the further improvement comprising the steps of A. following detection of said non-sequential write requests, reading said first and second bit masks, B. comparing said first and second bit masks to detect storage locations pre-allocated to said selected data file have not been written to, and C. de-allocating, in response to said detection of said non-sequential write requests, storage locations, in a storage region between said last written storage location and said last pre-allocated storage location, D. executing a determining step to determine at least one of an informational status and a data file extension pointer associated with said selected data file resulting from said de-allocating, and E. executing an update operation for updating at least one of said inode means and said indirect block means associated with said selected data file, to include said informational status and said data file extension pointer in accord with said determining step.

15. In a method for operating a digital data processing system in a stateless protocol environment, said digital processing system including at least one file server for storing and providing selective access to digital data files, and at least one client device, coupled to and in communication with said file server, said at least one client device including request means for generating a request to write data to at least a selected one of said digital data files, said file server including 'data storage means comprising a plurality of storage locations for storing said digital data files, inode means for storing an informational status associated with at least selected ones of said digital data files, indirect block means for storing a data extension pointer associated with at least selected ones of said files, response means for responding to said requests to write data by executing (i) a write operation to write data associated with said request to said selected digital data file, (ii) an update operation for updating, in connection with said write operation, said inode means associated with said file, and (iii) an acknowledgment operation for acknowledging said client device, said write request, only after completion of said write and update operations, the improvement comprising the steps of A. detecting, in said file server, multiple pending write requests received from one or more of said client devices and directed to said selected data file, B. creating a shadow inode at a location proximate to said selected data file, C. copying said informational status associated with said selected data file from the inode means associated therewith to said shadow inode, D. responding to said pending write requests by i) executing at least selected write operations to write data associated with said pending write requests,
ii) executing at least selected update operations for updating, in connection with said write operations, said informational status stored in said shadow inode, E. following said responding step, copying said informational status from said shadow inode to said inode means associated with said selected digital file, and F. executing an acknowledgment operation, acknowledging to said one or more client devices completion of said pending write requests, only after completion of said copying of said informational status, in accord with said stateless protocol.

* * * * *